US010146763B2

(12) United States Patent
Chaudhry et al.

(10) Patent No.: US 10,146,763 B2
(45) Date of Patent: Dec. 4, 2018

(54) RENDERABLE TEXT EXTRACTION TOOL

(71) Applicant: Bank of America Corporation, Charlotte, NC (US)

(72) Inventors: Neelam Rungta Chaudhry, New Delhi (IN); Sarath Magam, Chennai (IN); Badhri Narayanan Thiruvengadavan, Chennai (IN)

(73) Assignee: Bank of America Corporation, Charlotte, NC (US)

( * ) Notice: Subject to any disclaimer, the term of this patent is extended or adjusted under 35 U.S.C. 154(b) by 92 days.

(21) Appl. No.: 15/009,931

(22) Filed: Jan. 29, 2016

(65) Prior Publication Data

US 2017/0220530 A1 Aug. 3, 2017

(51) Int. Cl.
*G06F 17/27* (2006.01)
*G06F 17/21* (2006.01)
*G06F 17/24* (2006.01)

(52) U.S. Cl.
CPC ........ *G06F 17/2705* (2013.01); *G06F 17/212* (2013.01); *G06F 17/217* (2013.01); *G06F 17/246* (2013.01); *G06F 17/248* (2013.01)

(58) Field of Classification Search
CPC .... G06F 3/0482; G06F 17/212; G06F 17/217; G06F 17/2247; G06F 17/246; G06F 17/248; G06F 17/2705
See application file for complete search history.

(56) References Cited

U.S. PATENT DOCUMENTS

| 8,230,332 | B2 | 7/2012 | Summers et al. |
| 8,345,977 | B2 | 1/2013 | Sun et al. |
| 8,356,045 | B2 | 1/2013 | Chang et al. |
| 2003/0068099 | A1* | 4/2003 | Chao ................. G06F 17/30719 382/282 |
| 2005/0251527 | A1* | 11/2005 | Phillips .................. G06Q 10/06 |
| 2007/0244925 | A1* | 10/2007 | Albouze ........... G06F 17/30265 |
| 2008/0209311 | A1* | 8/2008 | Agronik .................. G06T 11/60 715/234 |

(Continued)

OTHER PUBLICATIONS

"Apache POI—The Java API for Microsoft Documents," Retrieved on Jan. 1, 2016, poi.apache.org.
"Class JComponent," Retrieved on Jan. 14, 2016, Oracle, Redwood Shores, CA.

(Continued)

*Primary Examiner* — Stephen S Hong
*Assistant Examiner* — Hope C Sheffield
(74) *Attorney, Agent, or Firm* — Weuss & Arons LLP; Michael A. Springs, Esq.

(57) ABSTRACT

Methods for converting an Adobe™ PDF document into an editable document is provided. Methods may receive an Adobe™ PDF document and displaying the Adobe™ PDF document. Methods may enable a user to create a plurality of horizontal lines and a plurality of vertical lines on the document. The horizontal and vertical lines may create rows and columns. Methods may create an editable document upon receipt of at least one row and at least one column on the document. The editable document may correspond to the rows and columns within the created horizontal and vertical lines. The editable document may be a Microsoft Excel™ spreadsheet or any other suitable document. Methods may create a horizontal line or vertical line at a location of a cursor when a corresponding click is received.

12 Claims, 11 Drawing Sheets

(56) References Cited

U.S. PATENT DOCUMENTS

| | | | | |
|---|---|---|---|---|
| 2008/0295002 A1* | 11/2008 | Hebard | ............... | G06F 3/0486 715/760 |
| 2012/0236377 A1* | 9/2012 | Kaigawa | ............ | G06K 9/00442 358/505 |
| 2013/0014041 A1* | 1/2013 | Jaeger | ................... | G06F 3/0481 715/765 |
| 2014/0026187 A1* | 1/2014 | Johnson | .................. | G06F 21/53 726/3 |
| 2015/0205398 A1* | 7/2015 | Le | .......................... | G06T 11/00 345/173 |

OTHER PUBLICATIONS

"Class JPanel," Retrieved on Jan. 14, 2016, Oracle, Redwood Shores, CA.
"Dots Per Inch," Dec. 2, 2015, Wikimedia Foundation, Inc.
"How to Use Root Panes," Retrieved on Jan. 14, 2016, Oracle, Redwood Shores, CA.
"Java 2D Rendering," Retrieved on Jan. 14, 2016, Oracle, Redwood Shores, CA.
"JSON (JavaScript Object Notation)," Retrieved on Jan. 15, 2016, www.json.org.
"Using Top-Level Containers," Retrieved on Jan. 14, 2016, Oracle, Redwood Shores, CA.
"What is Swing?" Retrieved on Jan. 14, 2016, whatis.techtarget.com.
"What is the Difference Between Swing and AWT?" Retrieved on Jan. 14, 2016, Stack Overflow.
"XML Metadate Interchange," Retrieved on Jan. 15, 2016, Wikimedia Foundation, Inc.

* cited by examiner

RENDERABLE TEXT EXTRACTION TOOL

FIELD OF THE INVENTION

This invention relates to extracting renderable text from documents.

BACKGROUND OF THE INVENTION

In an entity, processes may receive Adobe™ portable document format (hereinafter, "PDF") documents. Some examples of such processes may be financial statement analytics, payroll payments processing and non-tabular data conversions for account settings. The processes may require manipulating data included on the PDF documents.

For the purposes of this application, PDF documents are typically substantially unable to be manipulated. Conventionally, the data was manually read from the PDF documents and re-entered into a computer application. The re-entry process is cumbersome as well as error-prone.

Therefore, a generic renderable text extraction tool may be desirable. Preferably, the tool may enable extraction of text from an editable PDF document. It may also be desirable for the tool to export the extracted text into a format specified by a user.

SUMMARY OF THE DISCLOSURE

An apparatus for extracting renderable text from an Adobe PDF™ document is provided. The apparatus may include a user interface. The user interface may be configured to receive the Adobe PDF™ document. The user interface may also be configured to render the Adobe PDF™ document into a dots per inch ("DPI") image. For the purposes of this application, rendering may be understood to mean utilizing a method that converts a PDF document into a DPI image. The original PDF document may be stored for later use. The DPI image may function easily in a Java™ region, as opposed to a PDF document, which may not function properly in a Java™ region. This may be at least because the DPI image is in a different format than is acceptable by the Java™ region.

The region may be a Java™ abstract window toolkit ("AWT") region. The region may be a Java™ Swing region.

Java™ AWT may be a Java™ interface to a computer system's native operating system's graphical user interface ("GUI") code. Therefore, AWT connects with the operating system layer. Because AWT utilizes operating system GUI code, an application created in AWT may work inconsistently across platforms.

Java™ Swing, on the other hand, may be a library of Java™ code. Java™ Swing may include its own functionality and logic to produce GUIs. Java™ Swing generally utilizes very minimal basic operating system functions. Therefore, Java™ Swing is more portable than Java™ AWT. But, because of the additional overhead produced by the layer of Java logic, Java™ Swing is sometimes slower than Java™ AWT.

The user interface may add the DPI image to a panel. The panel may be a Java™ JPanel or any other suitable panel or software structure. A JPanel may be a lightweight GUI container. The JPanel may hold various GUI elements. A JPanel may inherit its qualities from Java™ JComponent, which may inherit its qualities from Java™ Container, which may inherit its qualities from Java™ Component, which may inherit its qualities from Java™ Object.

Therefore, it may be understood that a JPanel may reside in a component. A component may be a Java™ JComponent or any other suitable component or software structure. A JComponent may be a base class for many Java™ Swing components.

In some instances, a top-level Swing container may be used as a component. A top-level Swing container may include a list of components. The components may include a root pane. The root pane may include a layered pane, a content pane and a glass pane.

The layered pane may be utilized to position the contents of the root pane. The content pane may include the root pane's visible components. The glass pane may be hidden initially. If made visible, the glass pane may act like a sheet of glass over the other parts of the root pane. The glass pane may be used to catch events or paint over an area of the root pane that already contains components. For example, one can display an image over multiple components using the glass pane.

The user interface may insert a pane into the component. The pane may be positioned on top of the DPI image. The pane may have a transparent quality. The pane may be a glass pane or any other suitable pane or software structure. The insertion may occur following rendering the PDF document and displaying the DPI image. The insertion may occur prior to rendering the PDF document or displaying the DPI image. The insertion may occur prior to displaying the DPI image, but after rendering the DPI image.

The user interface may support the use of a line insertion tool. The line insertion tool may enable a user to place one or more horizontal lines on the pane. The line insertion tool may also enable a user to place one or more vertical lines on the pane. The line insertion tool may include a toggle feature that enables a user to switch between horizontal line creation and vertical line creation.

The user interface may receive horizontal and vertical lines from the user. In some embodiments, upon receipt of at least two horizontal lines and at least two vertical lines from the user, the user interface may calculate a plurality of intersection points using a line intersection algorithm. The intersection points may outline a plurality of rectangular areas. The user interface may create a plurality of templates based on the rectangular areas.

The apparatus may also include a text extraction parser. The text extraction parser may be configured to extract text from a plurality of portions of the editable PDF document corresponding to the templates.

The text extraction parser may be configured to transform the extracted text into renderable text. The text extraction parser may also be configured to export the renderable text, utilizing the templates for text structure, into a manipulate-able document.

BRIEF DESCRIPTION OF THE DRAWINGS

The objects and advantages of the invention will be apparent upon consideration of the following detailed description, taken in conjunction with the accompanying drawings, in which like reference characters refer to like parts throughout, and in which:

FIG. 7 shows still another illustrative GUI of an embodiment of the invention;

DETAILED DESCRIPTION OF THE DISCLOSURE

A method for extracting renderable text from an Adobe PDF™ document is provided. The method may include receiving the Adobe PDF™ document. The method may include rendering the Adobe PDF™ document to a dots per inch ("DPI") image. The rendering may utilize an image, a font a glyph or any other suitable software structures. The DPI image may be used in a Java™ abstract window toolkit ("AWT") region. The DPI image may be used in a Java™ swing region. The DPI image may be used in any other suitable region.

The method may also include adding the DPI image to a panel. The panel may be a Java™ JPanel. The panel may be any suitable panel or software structure. The panel may reside in a component. The component may be a Java™ JComponent. The component may be any suitable component or software structure.

The method may also include displaying the DPI image within the component on a screen. The screen may be the screen of a personal computer, work computer, tablet, smartphone, and any other suitable computing device.

The method may also include inserting a pane into the component on top of the DPI image. The pane may have transparent quality. The insertion may occur upon rendering the Adobe™ PDF document. The insertion may occur upon displaying the DPI image on the screen. The insertion may occur upon both rendering the Adobe™ PDF document and displaying the DPI image.

The method may also include using a line insertion tool. The line insertion tool may enable a user to place one or more horizontal lines on the pane. The line insertion tool may also enable a user to place one or more vertical lines on the pane. The line insertion tool may be associated with a mouse. In certain embodiments, a user may toggle between creation of horizontal lines and creation of vertical lines by right clicking on the mouse.

In some embodiments, right clicking the mouse may open a mini menu. The menu may include two options: vertical and horizontal. The user may choose the vertical option, create vertical lines, and then choose the horizontal option, and then create horizontal lines, or vice versa.

The method may also include receiving horizontal lines and/or vertical lines from the user. In some embodiments, upon receipt of at least two horizontal lines and at least two vertical lines from the user, the method may include calculating, using a line intersection algorithm, a plurality of intersection points of the horizontal and vertical lines. The plurality of intersection points may outline a plurality of rectangular areas.

In some embodiments, the edges of a page may be utilized as vertical and/or horizontal lines. In these embodiments, if a user initially defines a horizontal line, he may create a row utilizing the one horizontal line. If a user initially defines a vertical line, he may be required to define at least one additional vertical line (two total vertical lines) and at least one horizontal line to create one row and one column.

The method may also include creating a plurality of templates based on the plurality of rectangular areas. A template may be a Java™ object. The template object may be based on the rectangular areas. A template may include data that enables a system to properly invoke the rectangular areas. In some embodiments, the rectangular areas themselves may be defined as Java™ objects, and therefore used in the text extraction.

Templates may also include extrapolating a portion of the defined rectangular areas from one portion of a page and utilizing the rectangular areas for a different portion of the page. The method may also include extracting text from a plurality of portions of the editable PDF document corresponding to the templates.

The method may also include transforming the extracted text into renderable text. The method may also include exporting, utilizing the templates for text structure, the renderable text into a manipulate-able document. The text structure may include columns, rows, paragraphs or any other suitable text structure. The manipulate-able document may be a Microsoft Excel™ spreadsheet or any other suitable document format.

The method may also include creating, utilizing multiple threads, compressed metadata comprising the renderable text, for each page of the Adobe PDF™ document. The metadata may be the rectangular area data or the template data. The rectangular area data/template data may be metadata about data included on the PDF page. The method may include saving the compressed metadata in a cache memory. The cache memory may an offline cache memory. Saving the compressed metadata in an offline cache memory may ensure optimal memory usage of the underlying computer system. This may be because the text extraction process may be CPU-intensive. Accessing the cache memory, as opposed to accessing the hard drive, during the text extraction process may increase speed and performance of the system.

The method may also include generating, utilizing a second set of multiple threads, a preview corresponding to the renderable text. The preview may include rows and columns which may be defined by the horizontal and vertical lines.

Illustrative embodiments of apparatus and methods in accordance with the principles of the invention will now be described with reference to the accompanying drawings, which form a part hereof. It is to be understood that other embodiments may be utilized and structural, functional and procedural modifications may be made without departing from the scope and spirit of the present invention.

Figure 1:
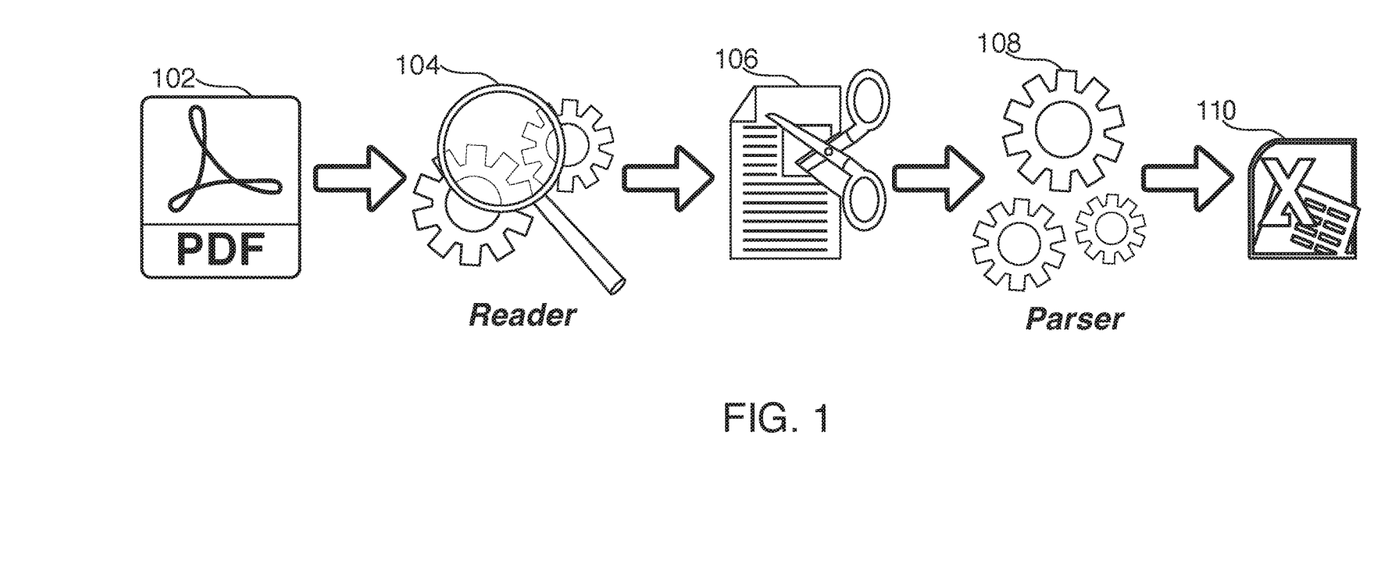
FIG. 1 shows an illustrative flow chart of an embodiment of the invention.

FIG. 1 shows an illustrative flow chart. PDF document 102 may be transmitted to reader 104. Reader 104 may accept PDF document 102. User interface 106 may display PDF document 102. User interface 106 may also enable a user to define horizontal and vertical coordinates of data included on PDF document 102. Utilizing the horizontal and/or vertical co-ordinates defined by user interface 106, parser 108 may extract renderable text from PDF document 102. Parser 108 may export the renderable text into a manipulate-able document format, for e.g., Microsoft™ Excel 110.

Figure 2:
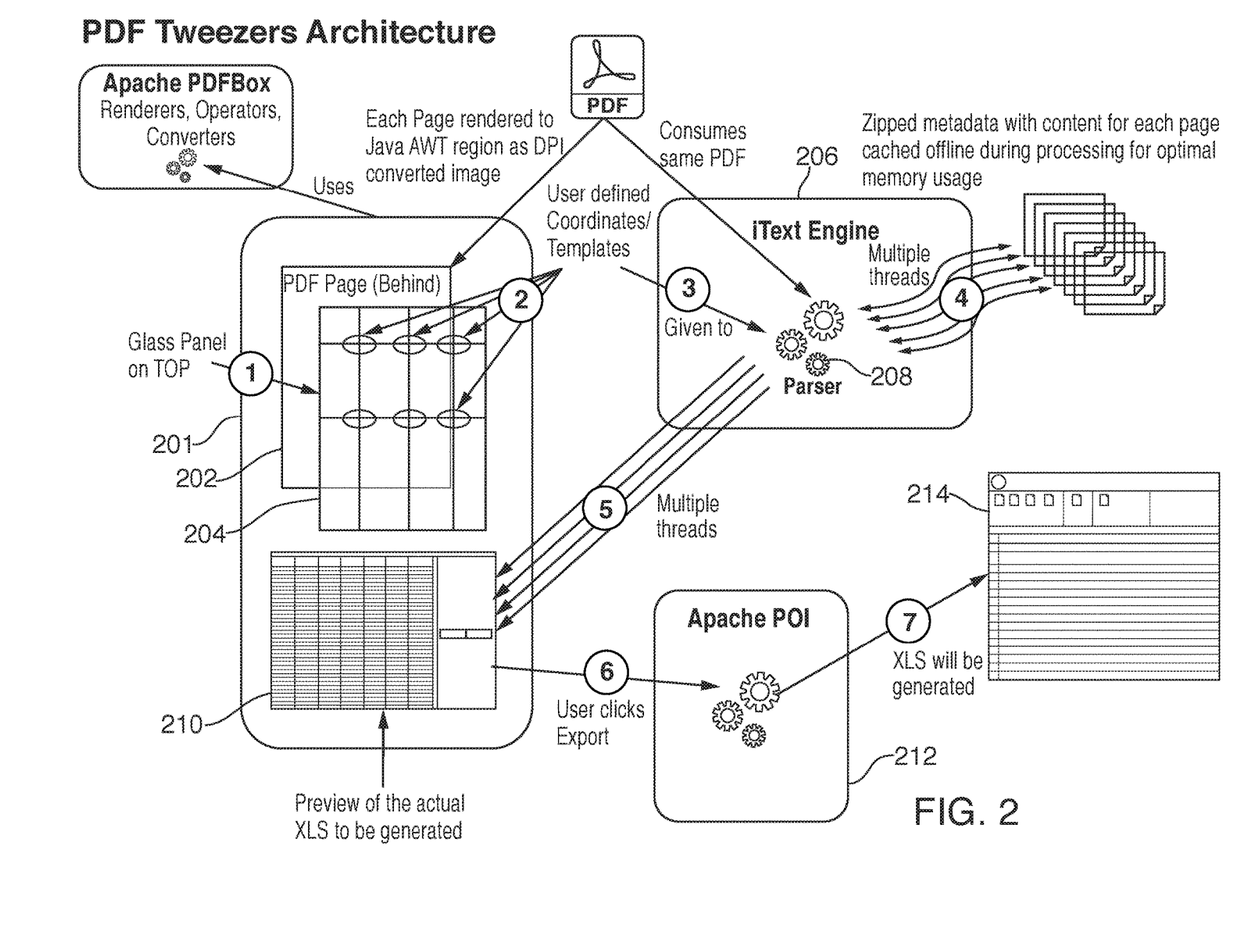
FIG. 2 shows an illustrative hybrid architecture/flow diagram of an embodiment of the invention.

FIG. 2 shows a hybrid architecture/flow diagram. User interface 201 may include PDF page 202 and glass panel 204. Step 1 may show placing glass panel 204 on top of PDF page 202. PDF page 202 may be rendered to a Java™ swing region as a dots per inch ("DPI") converted image. PDF page 202 may also be rendered to a Java™ abstract window toolkit ("AWT") region, which may be an earlier version of Java™ Swing.

Step 2 shows a user may define coordinates and/or templates on top of glass panel 204. The coordinates and/or templates may define sections of text to be extracted from PDF page 202.

User interface 201 may transmit the user-defined coordinates in addition to the PDF document to itext engine 206, as shown at step 3. Itext Engine 206 may include parser 208. Parser 208 may extract data from the transmitted PDF document 202 based on the received, previously, user-defined coordinates and/or templates. Step 4 shows itext engine 206, utilizing multiple threads, may cache the zipped metadata for each page of the PDF, together with the text content, offline, during processing of the document. Caching the metadata offline may ensure optimal memory usage of itext engine 206 during the text extraction process.

Step 5 shows itext engine 206, utilizing multiple threads, generating a preview of a renderable document to be generated, for e.g., a Microsoft™ Excel spreadsheet, on user interface 201.

Upon clicking an export button on preview 210, as shown at step 6, Apache™ POI (a Java™ application programming interface ("API") for Microsoft™ documents) 212 may generate Microsoft Excel™ spreadsheet 214, as shown at step 7.

In some embodiments, the process may not require human intervention. In these embodiments, the system may define the vertical and horizontal lines based on whitespace or any other suitable indicator.

Figure 3:
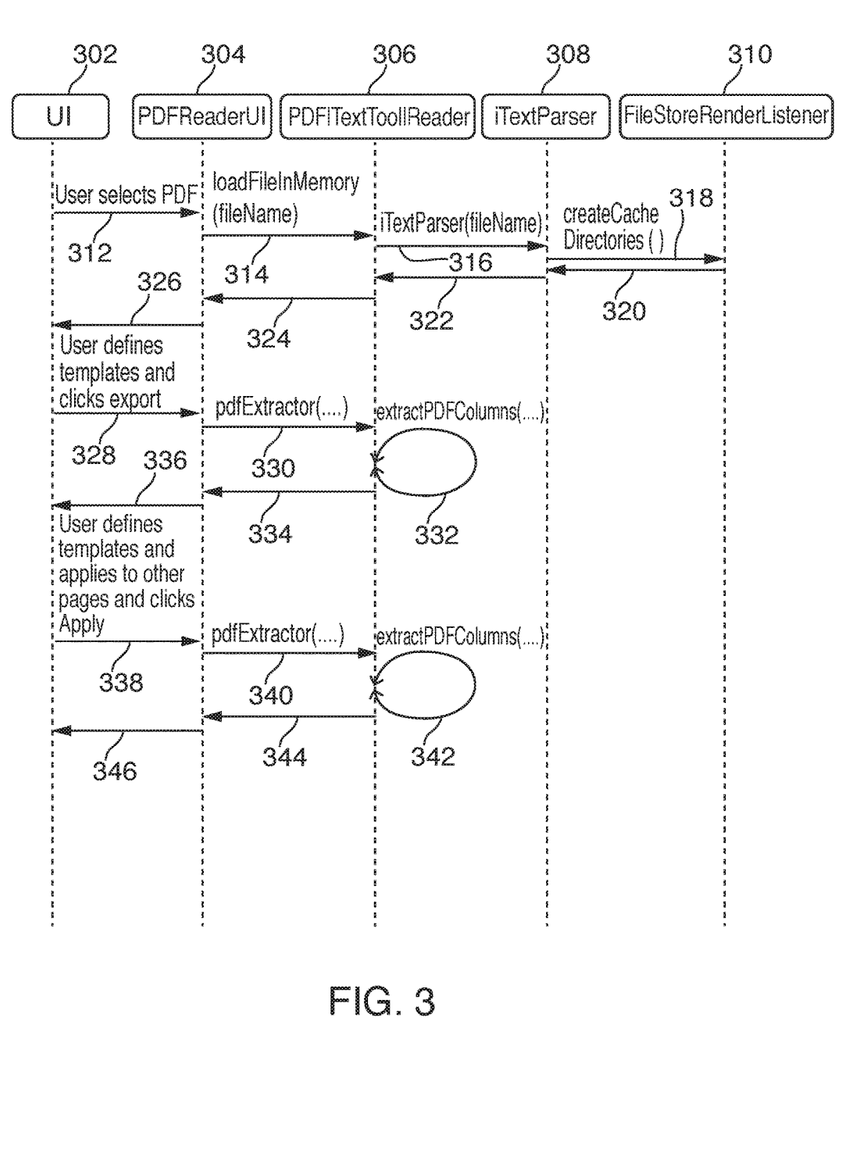
FIG. 3 shows an illustrative method calling diagram of an embodiment of the invention.

FIG. 3 shows a method calling diagram. A user may select a PDF document (method 312) at UI ("user interface") 302. The PDF file may be loaded in memory (method 314) at PDF Reader UI 304. The PDF file may be read by the itext engine at PDF itext tool reader 306. The PDF file may be parsed (method 316) at itext parser 308. The system may create cache directories for the extracted text (method 318) at file store render listener 318. Steps 320, 322, 324 and 326 may show a return message informing the applicable parties that the method steps have been completed successfully or unsuccessfully. In some embodiments, steps 320, 322, 324 and 326 may be a return message call in an object oriented programming ("OOP") language or any other suitable programming language.

It should be appreciated that UI 302, PDF reader UI 304, PDF itext tool reader 306, itext parser 308 and file store render listener 310 may be objects in an OOP programming language.

The user may define templates at UI 302 (method 328). The user may also click export at UI 302 (method 328). PDF reader UI 304 may receive the document and the defined templates. PDF reader UI 304 may transmit the PDF document, utilizing PDF Extractor (method 330), to PDF itext tool reader 306. PDF itext tool reader 306 may extract PDF columns from the PDF document (method 332). Steps 334 and 336 may show a return message informing the applicable parties that the method steps have been completed successfully or unsuccessfully. In some embodiments, steps 334 and 336 may be a return message call in an OOP language or any other suitable programming language.

The user may define templates at UI 302 (method 338). The user may also apply the templates to other pages (method 338). The user may click apply (method 338). PDF reader UI 304 may receive the document and the defined templates. PDF reader UI 304 may transmit the document and the defined templates, utilizing PDF Extractor method (method 340), the PDF itext tool reader 306. PDF itext tool reader 306 may extract PDF columns from the document corresponding to the pages chosen at 338 (method 342).

Steps 344 and 346 may be a return message informing the applicable parties that the method steps have been completed successfully or unsuccessfully. In some embodiments, steps 344 and 346 may be a return message call in an OOP language or any other suitable programming language.

Figure 4:
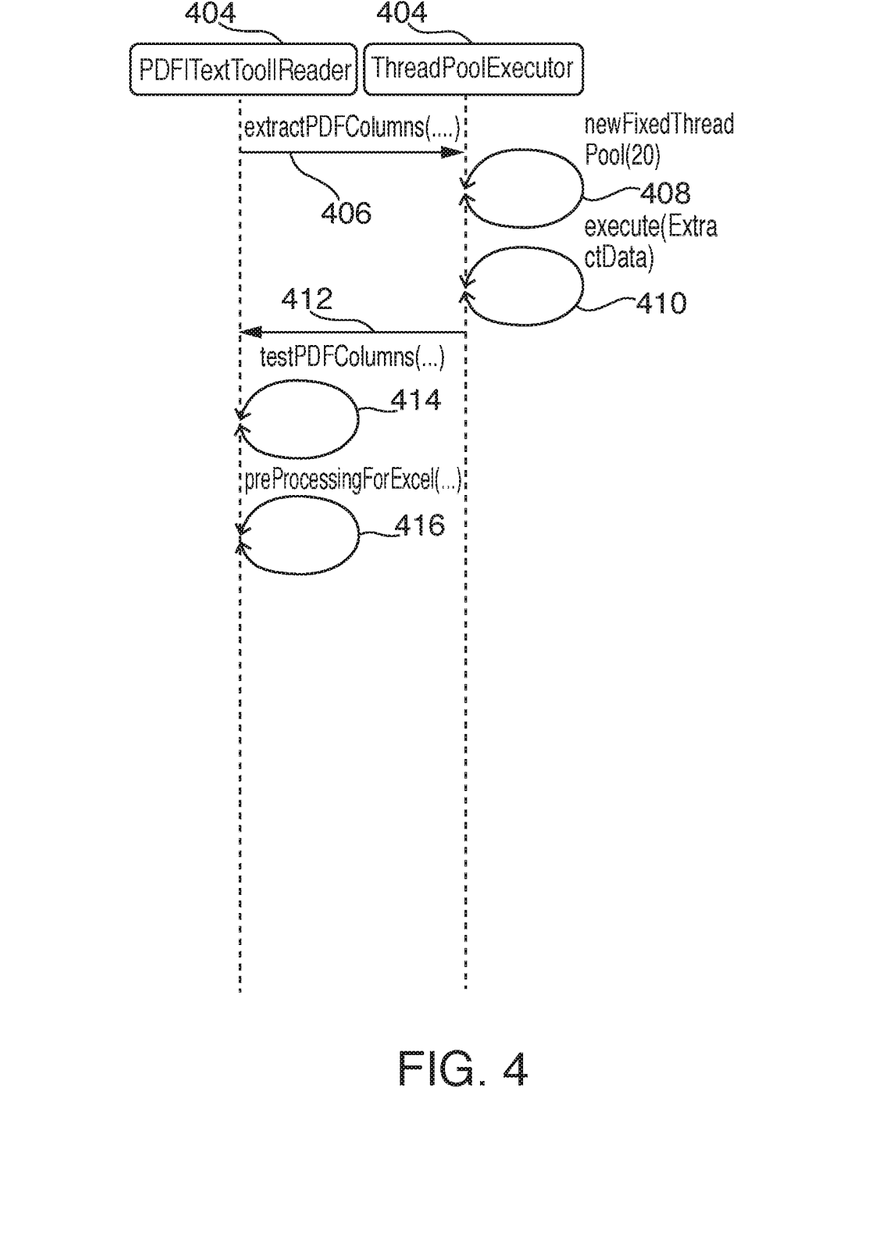
FIG. 4 shows an illustrative method calling diagram of an embodiment of the invention.

FIG. 4 shows an exemplary process flow. PDF itext tool reader 402 may extract PDF columns (method 406). Method 406 may utilize thread pool executor 404. Thread pool executor 404 may create a new fixed thread pool (method 408). The new fixed thread pool may contain twenty threads, or any other suitable number.

Thread pool executor 404 may also execute the data extraction (method 410). Step 412 may be a return to PDF itext tool reader 402. Method 414 may show PDF itext tool reader 402 testing the PDF columns. Testing of the PDF columns may ensure the quality of the text extraction. Method 416 may show pre-processing or pre-conditioning of the data to enable Microsoft Excel™ processing.

Figure 5:
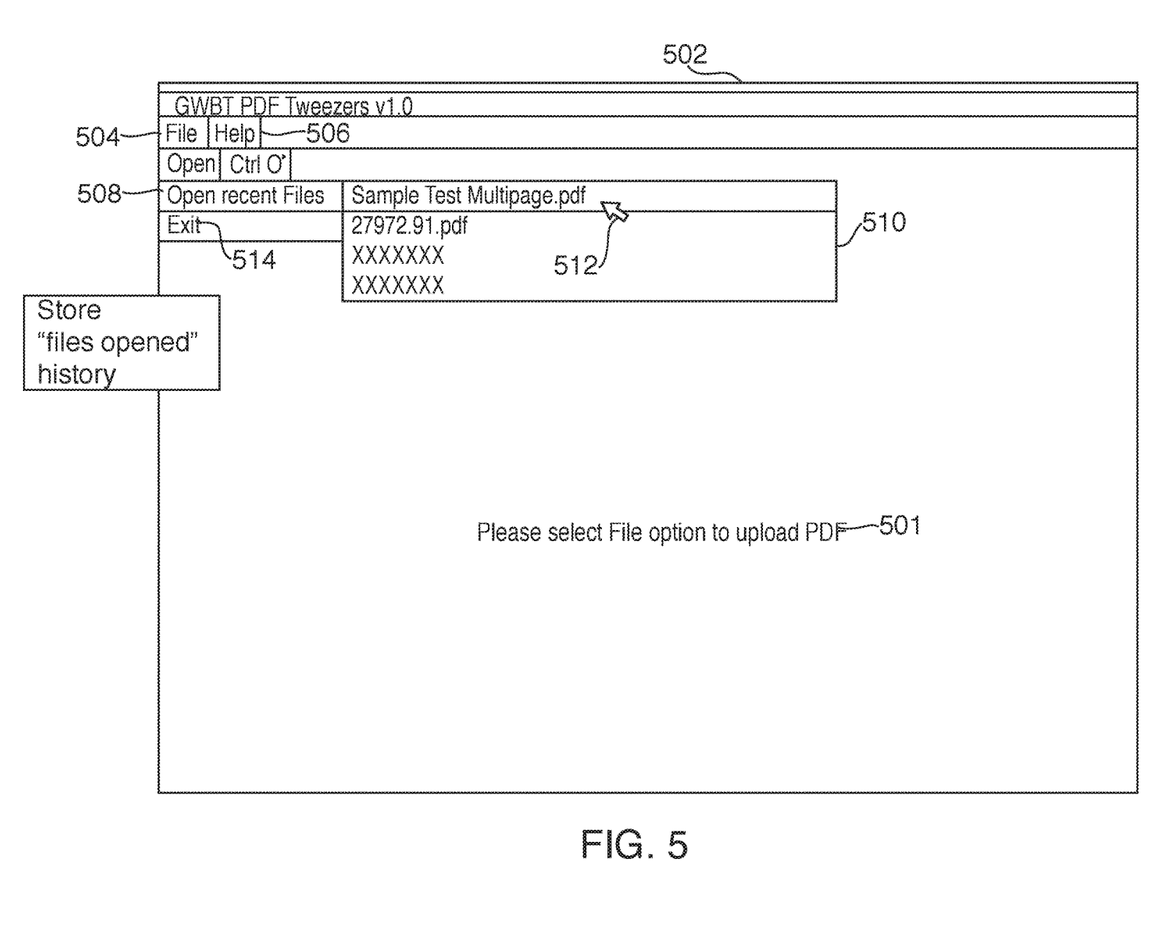
FIG. 5 shows an illustrative graphical user interface ("GUI") of an embodiment of the invention.

FIG. 5 shows user interface ("UI") 502. UI 502 may instruct a user to select a PDF file to upload, as shown at 501. UI 502 may include file menu 504. File menu 504 may include open option 506, open recent files option 508 and exit option 514. Open option 506 may open a browse menu. The browse menu may enable a user to choose any file from the entire network to which the underlying system is connected.

UI 502 may also direct a user to open a recently opened file. Utilizing cursor 512, a user may choose open recent files option 508. Upon clicking open recent files option 508, submenu 510 may open and display to the user recently opened files.

Exit option 514 may enable a user to close UI 502.

Figure 6:
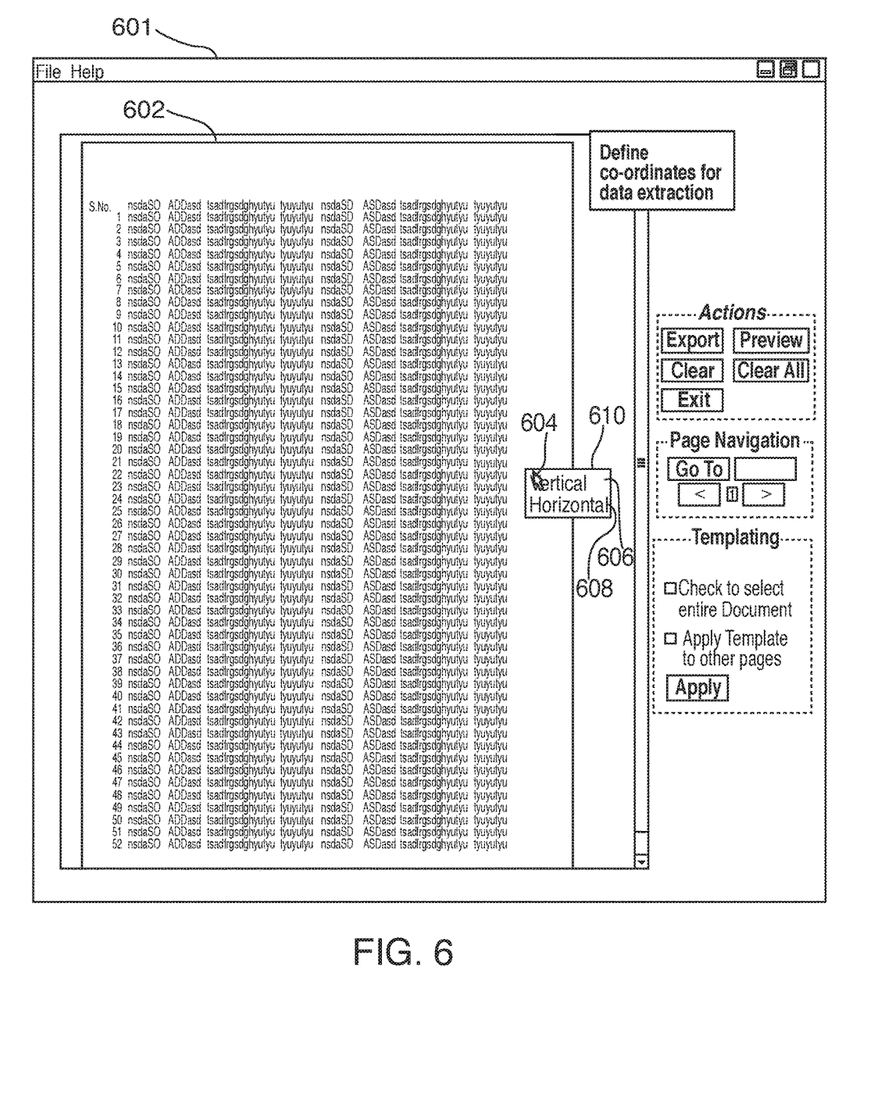
FIG. 6 shows another illustrative GUI of an embodiment of the invention.

FIG. 6 shows UI 601. A user may have opened a PDF file utilizing one of the options described in FIG. 5. The user may have opened the PDF file utilizing any other suitable option. PDF page 602 may be displayed on UI 601.

A user may right click, or utilize any other suitable mouse or keyboard operation, to open menu 610. Menu 610 may include vertical and horizontal options. Utilizing cursor 604, a user may select either vertical or horizontal. Upon selecting, for example, vertical, the user may click on PDF page 602. At the location that the mouse click was received the system may draw a vertical line across PDF page 602.

In some embodiments, the colors of both the vertical lines and the horizontal lines may be the same. In some embodiments, the horizontal lines may be one color and the vertical lines may be a different color.

FIG. 7 shows UI 702. PDF page 704 may be displayed on UI 702. A user may have defined the vertical lines 706, 708, 710, 712, 714 and 716, as described in FIG. 6. A user may also have defined the horizontal lines 718 and 720, as described in FIG. 6.

In FIG. 7, horizontal lines 718 and 720 define a portion of rows displayed on PDF page 704. The portion of rows may be extracted from the PDF page. In some embodiments, the system is configured to separate each row of text without the user placing a horizontal line in between each row of text.

In FIG. 7, vertical lines 706, 708, 710, 712, 714 and 716 define columns on PDF page 704. The text may be extracted from PDF page 704 in columns based on the vertical lines. The combination of vertical and horizontal lines may also be described as templates. In some embodiments, in the event, that the horizontal and/or vertical lines do not include all the text on the page, only the portion within the vertical and horizontal lines may be included in the document.

Actions menu 722 may include action buttons. Selecting export button 734 may export the text from PDF page 704 into a manipulate-able document, for example, Microsoft Excel™. Selecting preview button 736 may enable a user to view a preview of the manipulate-able document. Selecting clear button 738 may delete all of the vertical and horizontal lines on a specific page. Selecting clear all button 740 may delete all of the vertical and horizontal lines in an entire document. Selecting exit button 742 may close the program.

Page navigation menu 724 may enable a user to change pages with a PDF document. A user may type a page number into text entry field 728. Upon entering the page number or upon typing an "Enter" key, the system may "go to" the selected page, as shown at 726. A user may also utilize forward arrow 734 and back arrow 730 to change the page. Field 732 shows a user what page he or she is currently viewing.

Templating menu 726 may enable using the template, created for the current page, for other pages in the document. A user may select option 728, to apply the template to the entire document. A user may select option 730 to apply the template to a selected set of other pages in the document. Options 728 and 730 may be mutually exclusive of each other, when one option is selected, the other option may be disabled. The user may enter the page numbers into text entry field 732. A user may select apply button 734 to apply the changes selected in templating menu 726.

Figure 8:
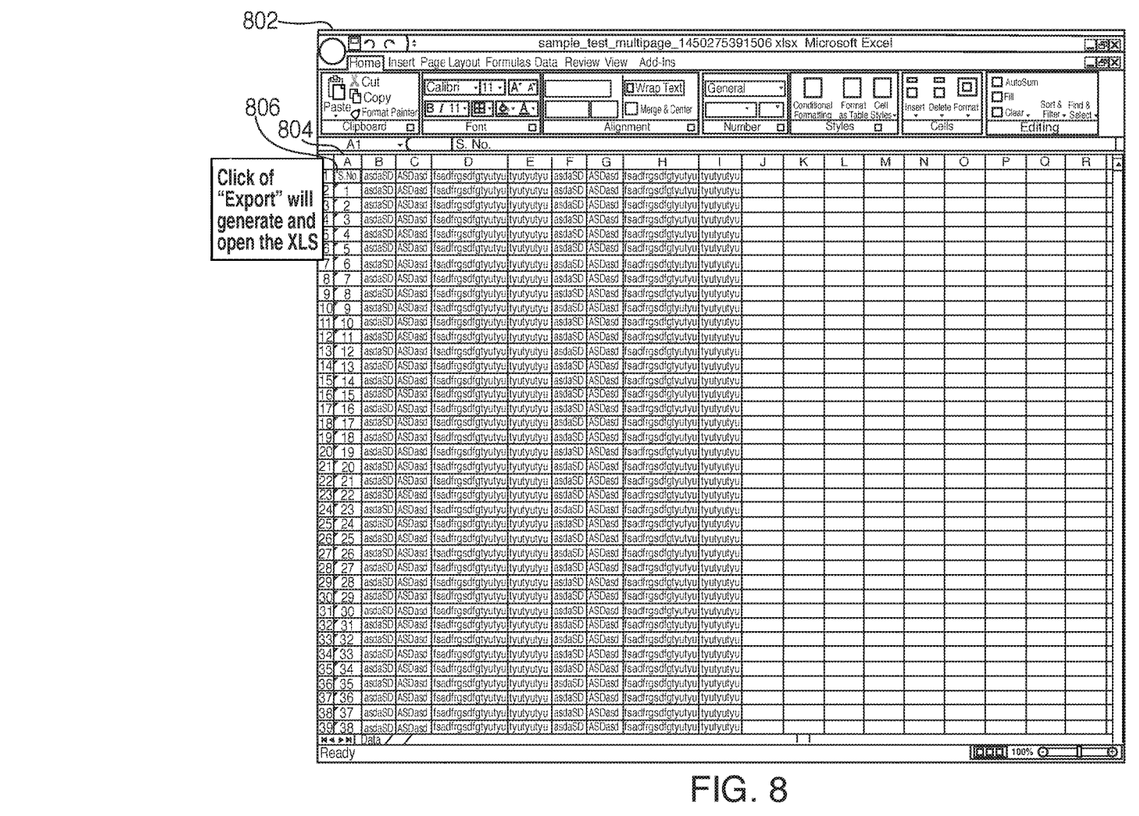
FIG. 8 shows an illustrative Microsoft™ Excel spreadsheet of an embodiment of the invention.

Upon selecting the export button discussed in FIG. 7, a user may be directed to a manipulate-able document. For the purposes of example, FIG. 8 shows a generated Microsoft Excel™ spreadsheet. Microsoft Excel™ spreadsheet 802 may include data from a PDF file. The columns in spreadsheet 802, which begin with column 804, may correspond to the vertical lines created by a user in the UI discussed above. The rows in the spreadsheet, which begin with row 806, may correspond to the region in between two horizontal lines created by a user in the UI discussed above.

Figure 9:
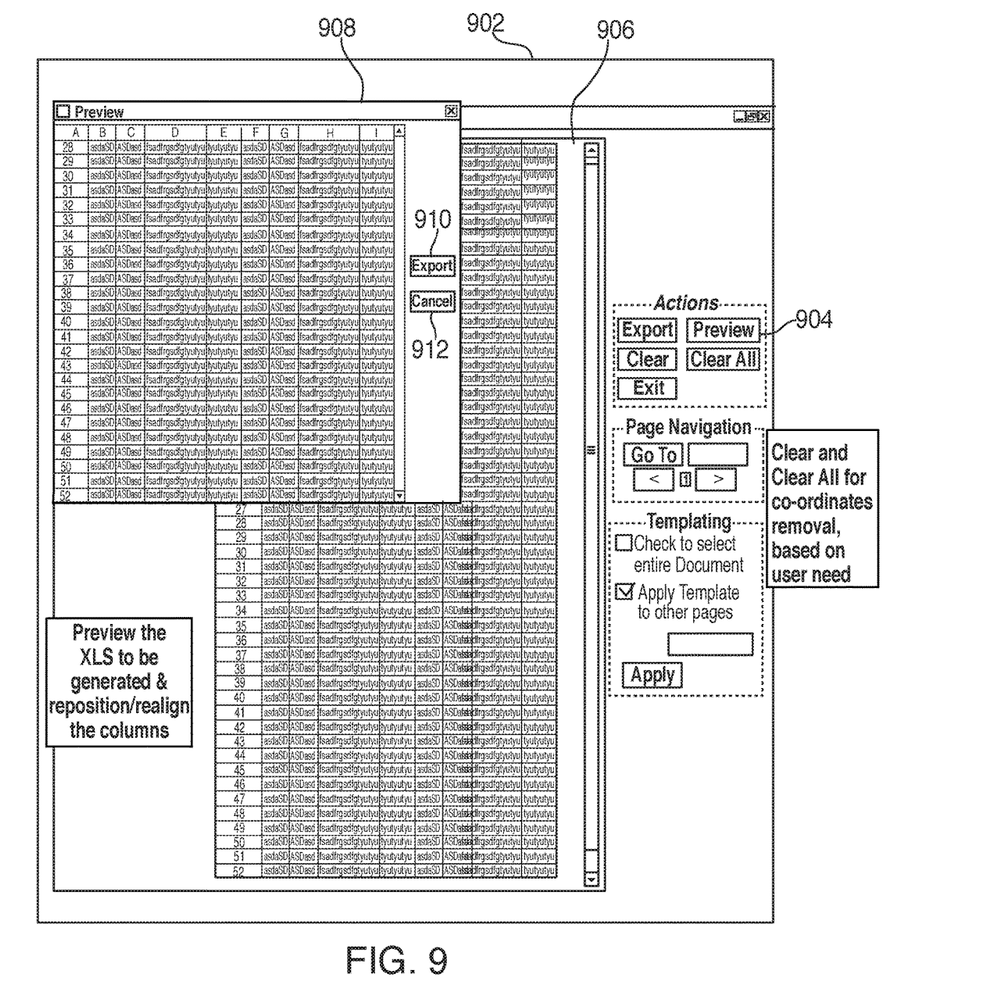
FIG. 9 shows another illustrative GUI of an embodiment of the invention.

FIG. 9 shows UI 902. A user may have selected preview button 904. Upon selection of preview button 904, preview 908 may be generated. Preview 908 may correspond to PDF document 906. In the event that a user is satisfied with preview 908, a user may click export button 910 to create a manipulate-able document. In the event that the user is not satisfied with the generated preview, a user may click cancel button 912 and be redirected to UI 902. At UI 902, the user may change the template to his or her satisfaction.

Figure 10:
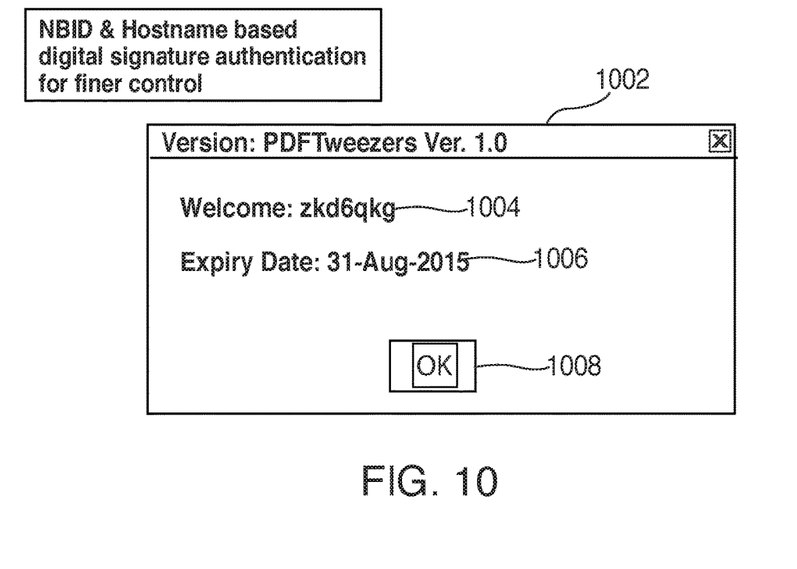
FIG. 10 shows yet another illustrative GUI of an embodiment of the invention.

In some embodiments, the system may utilize NBID and hostname-based digital signature authentication. The authentication may allow finer control of use of the PDF extraction application. FIG. 10 shows upon entering the PDF extraction application a user may be presented with an introductory window, as shown at 1002. The window may include the username (1004) and expiration date (1006) of the user. The user may select okay button (1008) to proceed to the UI.

Figure 11:
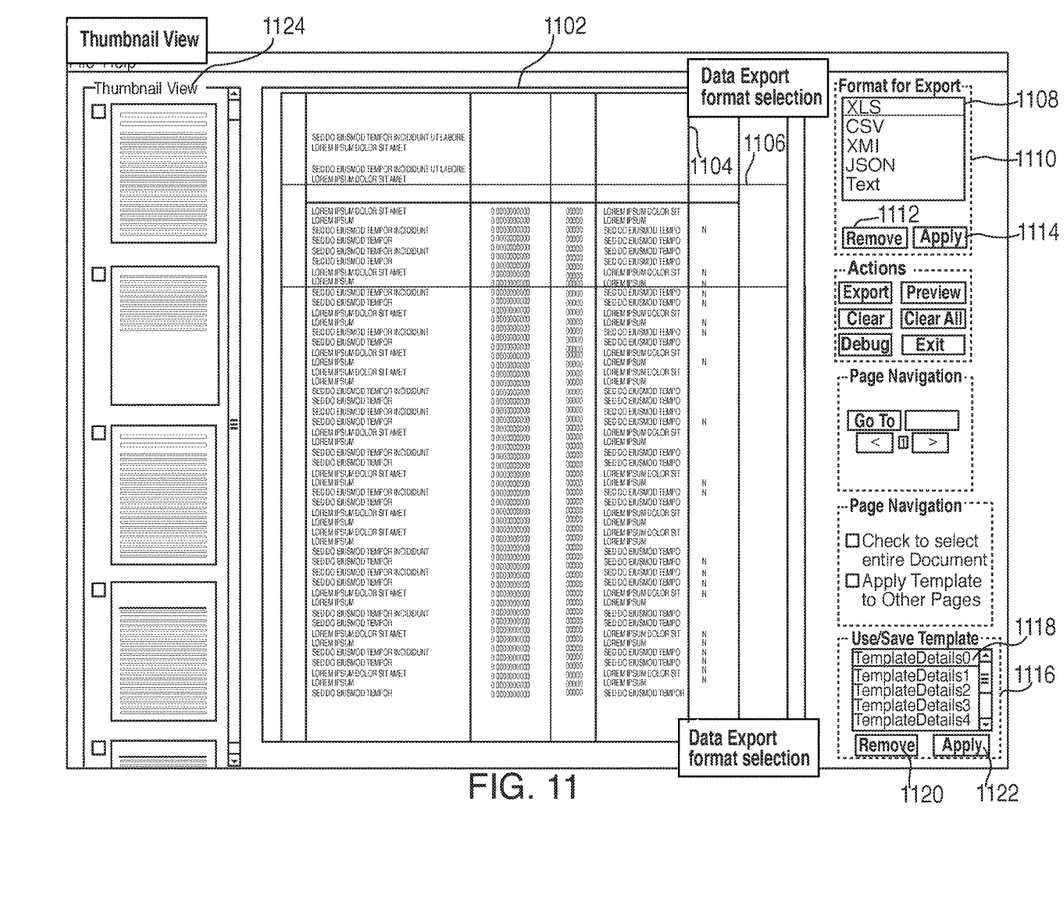
FIG. 11 shows still another illustrative GUI of an embodiment of the invention.

FIG. 11 shows another embodiment of the PDF extraction tool. In this embodiment, the PDF page may be displayed in the center of the screen, as shown at 1102. A user may have horizontal lines, for example, line 1106 and vertical lines, for example, line 1104, on PDF page 1102. The tool may also include thumbnail view 1124. Thumbnail view 1124 may enable a user to view a small view of each page in the document. Thumbnail view 1124 may also enable a user to view the vertical and horizontal lines drawn on the document.

PDF extraction tool may also include format to export menu 1110. Format to export menu 1110 may enable a user to export the PDF document to a variety of formats, for example, XLS (Excel) (1108), CSV (comma separated values), XML (eXtensible markup language), XMI (eXtensible markup language metadata interchange), JSON (JavaScript object notation) and text. Format to export menu 1110 may include remove button 1112 and apply button 1114. Remove button 1112 may enable a user to remove one of the options to export. Apply button 1114 may enable a user to apply the selected format to export. A user may select more than one format to export.

PDF extraction tool may also include use/save template menu 1116. Use/save template menu 1116 may enable a user to create a template in a specific document, save the created template and utilize the template for other documents. TemplateDetails0 1118 may be an example of a saved template. A user may utilize more than one template for a specific document. Use/save template menu 1116 may include remove button 1120 and apply button 1122. Remove button 1120 may enable a user to remove a selected template. Apply button 1122 may enable a user to apply a selected template to the document.

Thus, methods and apparatus for a PDF extraction tool have been provided. Persons skilled in the art will appreciate that the present invention can be practiced by other than the described embodiments, which are presented for purposes of illustration rather than of limitation, and that the present invention is limited only by the claims that follow.

What is claimed is:

1. An apparatus for extracting renderable text from a document, the apparatus comprising:
    a user interface, said user interface configured to:
        receive the document;
        render the document to a rasterized image;
        add the image to a software panel within a software structure;
        display, on a screen, the image within the software structure;
        upon rendering the document and displaying the image on the screen, insert a pane into the software structure on top of the image, said pane having a transparent quality;
        enable a user, using a line insertion tool, to place two or more individual horizontal lines on the pane, independent of simultaneous insertion of any vertical lines;
        enable the user, using the line insertion tool, to place two or more individual vertical lines on the pane, independent of simultaneous insertion of any horizontal lines;
        upon receipt of at least two individual horizontal lines and at least two individual vertical lines from the user, calculate, using a line intersection algorithm, a plurality of intersection points of the horizontal and vertical lines, said plurality of intersection points outlining a plurality of rectangular areas, at least one of said plurality of rectangular areas being enclosed on all four sides by:
            a first portion of a first horizontal line, included in the two or more horizontal lines, a first portion of a second horizontal line, included in the two or more horizontal lines, said first portion of the second horizontal line corresponding to the first portion of the first horizontal line;

a first portion of a first vertical line, included in the two or more vertical lines; and a first portion of a second vertical line, included in the two or more vertical lines, said first portion of the second vertical line corresponding to the portion of the first vertical lines:

the remainder of the plurality of rectangular areas being defined by at least one of:

a second portion of the first horizontal line and a second portion of the first vertical line;

the first portion of the first horizontal line, the second portion of the first vertical line and a second portion of the second vertical line;

the second portion of the second vertical line and a third portion of the first horizontal line;

the third portion of the first horizontal line, the first portion of the second vertical line and a third portion of the second horizontal line:

the third portion of the second horizontal line and a third portion of the second vertical line;

the third portion of the second vertical line, the first portion of the second horizontal line and a third portion of the first vertical line; and the third portion of the first vertical line and a second portion of the horizontal line:

a text extraction parser, said text extraction parser that is configured to:

transform the plurality of rectangular areas into a template;

extract text from a plurality of portions of the rendered displayed image corresponding to the template;

transform the extracted text into renderable text;

export, utilizing the template for text structure, the renderable text into a spreadsheet; and save the template; and a template module that utilizes the saved template to extract text in a second document.

2. The apparatus of claim 1, wherein the rendering uses at least one of an image, a font and a glyph.

3. The apparatus of claim 1, wherein the text extraction parser, utilizing a first set of multiple threads, creates compressed metadata comprising the renderable text, for each page of the document, and saves the compressed metadata in a cache memory.

4. The apparatus of claim 3, wherein the text extraction parser, utilizing a second set of multiple threads, generates a preview corresponding to the renderable text, said preview including rows and columns defined at least in part by the horizontal and vertical lines.

5. The apparatus of claim 1, wherein the manipulate-able document is a comma separated values ("CSV") document.

6. The apparatus of claim 1, wherein the manipulate-able document is an eXtensible markup language ("XML") document.

7. A method for extracting renderable text from an document, the method comprising:

receiving the document;

rendering the document to a rasterized image;

adding the image to a software panel within a software structure;

displaying the image within the software structure on a screen;

upon rendering the document and displaying the image on the screen, inserting a pane into the software structure on top of the image, said pane having a transparent quality;

enabling a user, using a line insertion tool, to place two or more individual horizontal lines on the pane, independent of simultaneous insertion of any vertical lines;

enabling a user, using a line insertion tool, to place two or more individual vertical lines on the pane, independent of simultaneous insertion of any horizontal lines;

upon receipt of at least two individual horizontal lines and at least two individual vertical lines from the user, calculating, using a line intersection algorithm, a plurality of intersection points of the horizontal and vertical lines, said plurality of intersection points outlining a plurality of rectangular areas, at least one of said plurality of rectangular areas being enclosed on all four sides by:

a first portion of a first horizontal line, included in the two or more horizontal lines, a first portion of a second horizontal line, included in the two or more horizontal lines, said first portion of the second horizontal line corresponding to the first portion of the first horizontal line:

a first portion of a first vertical line, included in the two or more vertical lines; and a first portion of a second vertical line, included in the two or more vertical lines, said first portion of the second vertical line corresponding to the portion of the first vertical lines:

the remainder of the plurality of rectangular areas being defined by at least one of:

a second portion of the first horizontal line and a second portion of the first vertical line;

the first portion of the first horizontal line, the second portion of the first vertical line and a second portion of the second vertical line;

the second portion of the second vertical line and a third portion of the first horizontal line;

the third portion of the first horizontal line, the first portion of the second vertical line and a third portion of the second horizontal line;

the third portion of the second horizontal line and a third portion of the second vertical line;

the third portion of the second vertical line, the first portion of the second horizontal line and a third portion of the first vertical line: and the third portion of the first vertical line and a second portion of the horizontal line:

transforming the plurality of rectangular areas into a template data structure;

extracting text from a plurality of portions of the converted displayed image corresponding to the template data structure;

transforming the extracted text into renderable text;

exporting, utilizing the template data structure for text structure, the renderable text into a manipulate-able document;

saving the template data structure; and utilizing the saved template data structure to extract text in a second document.

8. The method of claim 7, further comprising wherein the rendering uses at least one of an image, a font and a glyph.

9. The method of claim 7, further comprising:

creating, utilizing a first set of multiple threads, compressed metadata comprising the renderable text, for each page of the document; and saving the compressed metadata in a cache memory.

10. The method of claim 9, further comprising generating, utilizing a second set of multiple threads, a preview corresponding to the renderable text, said preview including rows and columns defined at least in part by the horizontal and vertical lines.

11. The method of claim 7, wherein the manipulate-able document is a spreadsheet.

12. The method of claim 7, wherein the manipulate-able document is a comma separated values ("CSV") document.

* * * * *